United States Patent [19]

Darden

[11] 4,090,306

[45] May 23, 1978

[54] MAGNIFIED DIAL LEVEL INDICATOR WITH MAGNETIC SWING PLATE

[76] Inventor: Donald R. Darden, 519 Corday St., Lot 3, Pensacola, Fla. 32503

[21] Appl. No.: 763,606

[22] Filed: Jan. 28, 1977

[51] Int. Cl.² .............................................. G01C 9/12
[52] U.S. Cl. ...................................... 33/391; 33/347; 33/348; 350/114
[58] Field of Search ............... 33/88, 89, 340, 341, 33/343, 347, 348, 370, 371, 374, 375, 376, 391, 395; 350/114–116; 324/115

[56] References Cited

U.S. PATENT DOCUMENTS

| 407,285 | 7/1889 | Ensminger | 33/89 |
|---|---|---|---|
| 679,577 | 7/1901 | Schaffner | 33/348 |
| 962,467 | 6/1910 | Rhodes | 33/391 |
| 1,797,213 | 3/1931 | Marcum | 33/117 |
| 2,551,524 | 5/1951 | Bullivant | 33/374 |
| 2,589,263 | 3/1952 | Kenosian | 350/115 X |
| 2,659,976 | 11/1953 | Callahan | 33/341 |
| 3,103,749 | 9/1963 | Dillemuth | 33/347 |
| 3,762,799 | 10/1973 | Shapiro | 350/116 |

*Primary Examiner*—Charles E. Phillips
*Attorney, Agent, or Firm*—Berman, Aisenberg & Platt

[57] ABSTRACT

A level indicator which features a pendulum-style magnified dial and a versatile magnetic swing plate or base. The swing plate is pivotally and laterally moveable with respect to the main casing of the level indicator to provide a more stable and accurate adherence to the surface whose alignment is being checked. The magnetic surface of the swing plate cooperates with a coplanar magnetic face of a fixed-position heel plate to add further stability and accuracy. The level indicator features a hairline-bearing suspended mass in the form of a magnifying lens, the hairline being preferably scribed along its outer convex surface to eliminate parallax errors. The indicia-bearing dial plate may be edgewise illuminated by one or two light sources internally positioned and powered. Two substantially identical viewing faces are preferably provided to increase versatility.

34 Claims, 16 Drawing Figures

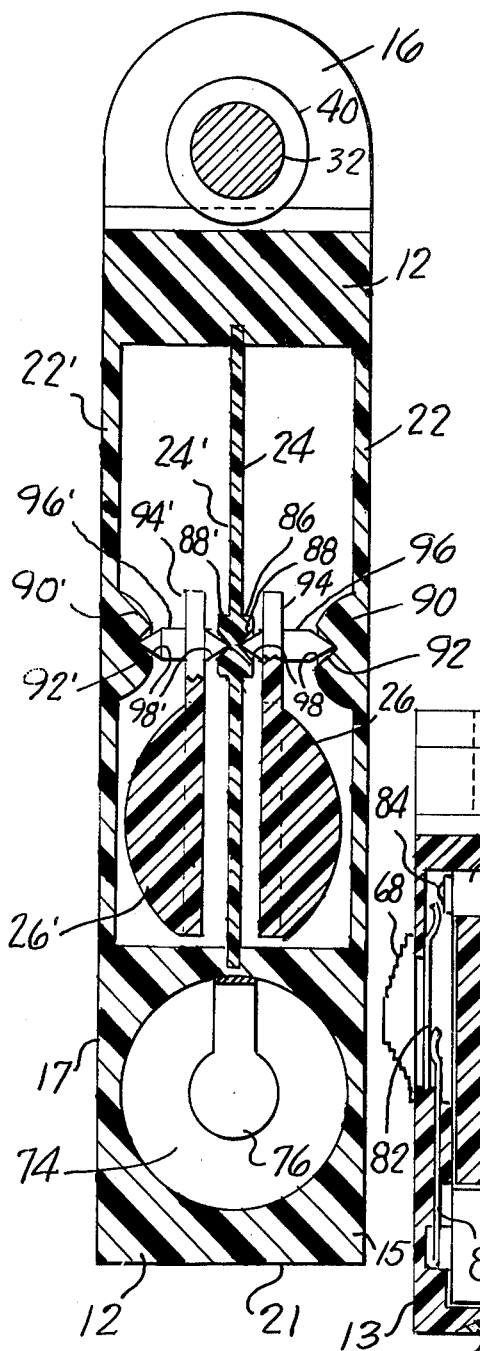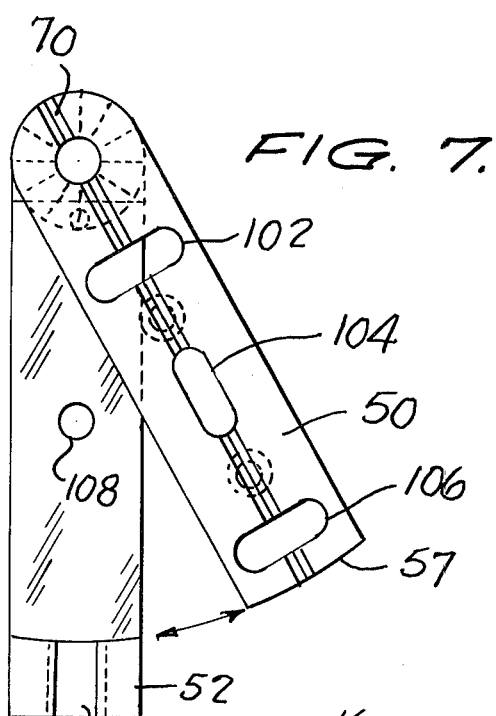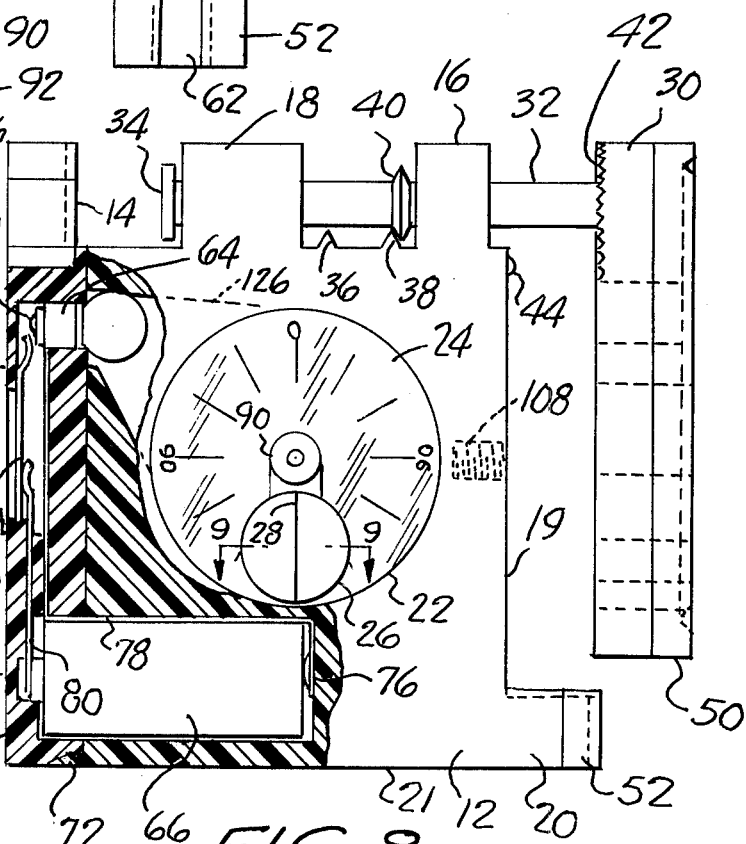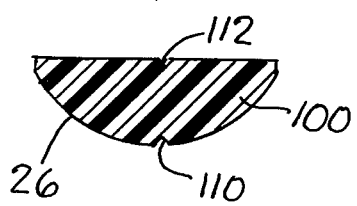

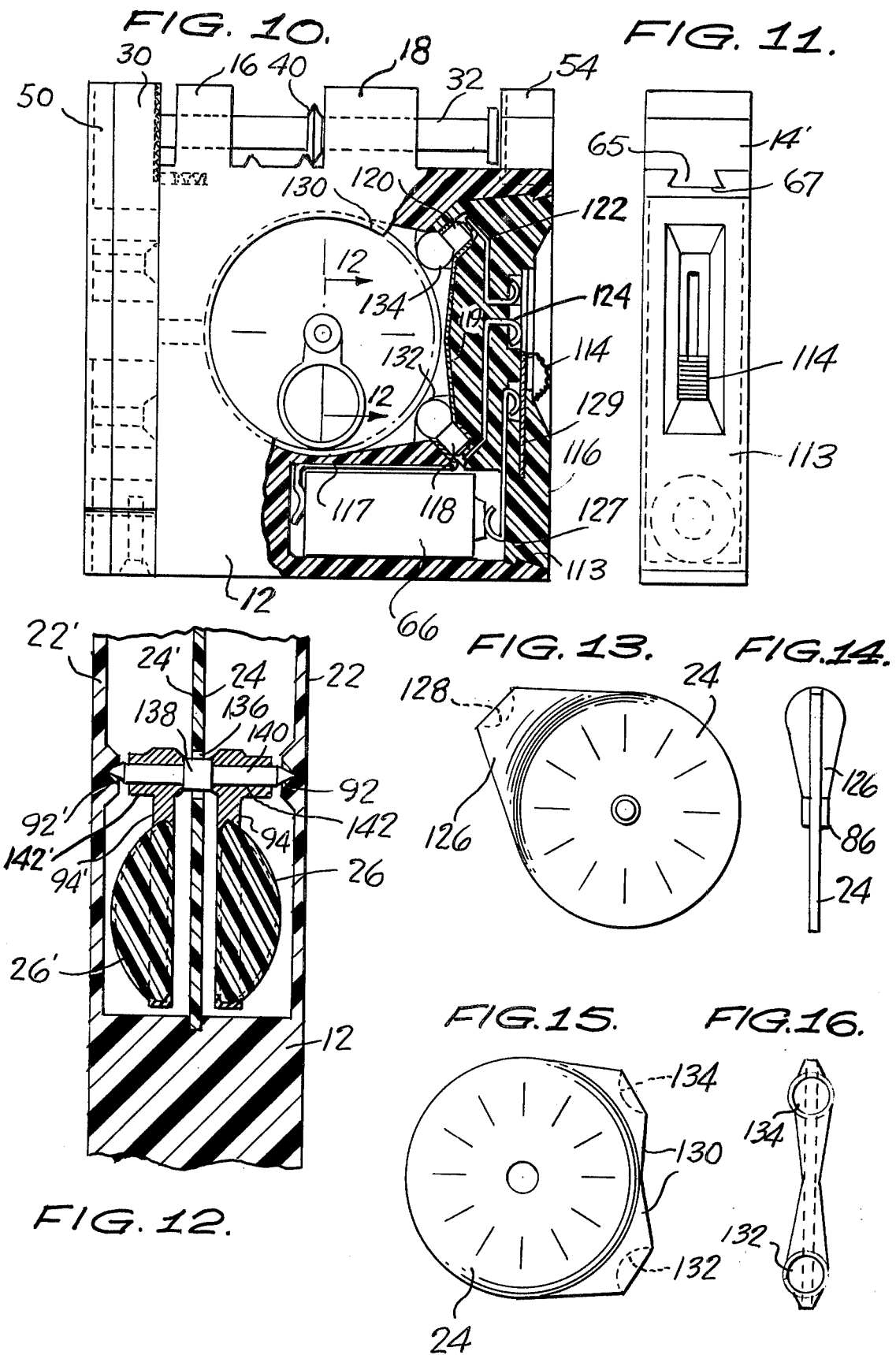

MAGNIFIED DIAL LEVEL INDICATOR WITH MAGNETIC SWING PLATE

BACKGROUND OF THE INVENTION

1. Field of the Invention

The present invention is related generally to level indicating devices and tools and, more particularly, is directed towards a pendulum-style level indicator which permits precision alignment of metal tools and work pieces.

2. Description of the Prior Art

Several circumstances exist which require precision alignment tools or devices for which I have discovered that presently available level indicators or the like are woefully inadequate. One such set of circumstances occurs, for example, during the alignment of a metal circular saw blade in circular hand saws, radial saws, table saws, and the like. Alignment of such metal cutting blades poses several unique problems. For example, the cutting blade must be aligned while mounted in the power tool, which presents certain safety problems. Also, the alignment should be taken off of the circular blade itself for greatest accuracy. Further, the physical access to such blades is often restricted, such that a fairly small, compact alignment tool is required.

The safety factor requires a tool that would easily disassociate itself from the blade if power were inadvertently applied to the tool during the alignment procedure. The requirement of permitting easy selection of setting or reference angles dictated utilization of a pendulum-style, rather than a bubble-style, level. However, presently available pendulum-style levels were found to be far too bulky for the purposes contemplated. A pendulum-style level built with a small indicia-bearing dial face would pose further problems in measurement accuracy.

The prior art pendulum-style levels of which I am aware are deficient in one or more respects. As mentioned above, a sufficiently small dial face would result in reduced accuracy readings. Some of the prior art levels require a prior alignment of surfaces as a reference for future alignments, permanent or difficult attachment of the level to the surfaces with which it is to be utilized, or a non-temporary placement along one axis and at one point of alignment. Overall, the prior art devices lack precision as a result of the failure to provide a precision reference, the failure to provide sufficiently large indicia, and the failure to take into account parallax error.

Typical prior art United States Patents in this general area of which I am aware include the following: U.S. Pat. Nos. 679,577; 1,507,334; 2,527,982; 2,535,791; 2,822,623; and 3,591,925. However, none of the foregoing overcome all of the deficiencies generally discussed above with respect to prior art pendulum-style level indicators.

It was therefore quite apparent to me that a great need exists for a versatile, compact, and precision pendulum-style level which offers readability, accuracy, ease of use, and overcomes all of the deficiencies noted above.

OBJECTS AND SUMMARY OF THE INVENTION

It is therefore a primary object of the present invention to provide a pendulum-style level indicator which overcomes all of the deficiencies noted above with respect to prior art devices.

Another object of the present invention is to provide a novel and unique pendulum-style level indicator which is compact, accurate, inexpensive to manufacture, and easy to operate.

A still further object of the present invention is to provide a pendulum-style level indicator which incorporates a readily releasable means for mounting same to the surfaces whose alignment is desired to be measured.

An additional object of the present invention is to provide a level indicator which, although small, is accurate, easy to read, may be utilized in a variety of different applications, may be adhered to a work piece in any of a plurality of different configurations, and which represents a distinct improvement over prior art devices of the same general nature.

Another object of the present invention is to provide a pendulum-style level indicator for which readability is enhanced, the chance of parallax error is greatly reduced along with increased resolution, provides a dual mode operational capability, and increased stability and accuracy.

The foregoing and other objects are attained in accordance with one aspect of the present invention through the provision of a level which comprises a main body casing having a pair of mutually perpendicular planar measuring surfaces that are disposed as the outer edges thereof. Means are centrally disposed in the casing for indicating the angle of inclination of the measuring surfaces with respect to the vertical. Means are also provided for selectively positioning one of the planar measuring surfaces either adjacent the casing or laterally offset therefrom. The selected positioning means also preferably includes means for pivoting the surface with respect to the casing to permit free swinging readings for the level.

In accordance with more specific aspects of the present invention, the selected positioning means comprises a swing plate having an outer surface which consists of one of the mutually perpendicular planar measuring surfaces. The pivoting means preferably comprises a pivot arm which extends transversely from one end of the swing plate through means that extend from the main body casing for moveably receiving the pivot arm to permit lateral and rotational movement thereof. The selected positioning means comprises flange means extending peripherally about the pivot arm, and means that cooperate with the flange means for limiting the lateral movement of the pivot arm between a recessed position adjacent the casing, and an extended position. The lateral movement limiting means, in a preferred embodiment, also comprises the means for moveably receiving the pivot arm which, in turn, comprises a pair of upstanding spaced posts having coaxial shafts formed therethrough. The lateral movement limiting means further comprises a pair of ridges formed on the upper surface of the casing in juxtaposition to the pair of upstanding post members, respectively, so as to permit the flange means to be selectively disposed between one of the ridges and its associated juxtaposed post member.

In accordance with yet other aspects of the present invention, the outer surface of the swing plate is preferably comprised of a magnetic material and further includes aperature means positioned therethrough for receiving means which permit a more permanent mounting of the swing plate to the surface to be measured or aligned. Further, the swing plate may include a V-shaped notch extending longitudinally thereof for permitting the tool to align edges and small-diameter curved surfaces.

In accordance with yet other aspects of the present invention, the end of the swing plate from which the pivot arm extends includes means formed on its inner surface for permitting incremented pivotal rotation of the swing plate with respect to the casing. In a more specific embodiment, the rotation incrementing means comprises a plurality of notches that extend radially outwardly from the point of attachment of the pivot arm. Spring-actuated detent means preferably extend from the casing so as to be engaged by the notches so as to define and hold the swing plate in a particular angular orientation when in its recessed position.

In accordance with still further aspects of the present invention, the main body casing preferably includes a heel plate which cooperates with the swing plate when in its recessed position to provide an extended planar reference surface than would otherwise be available. The heel plate more particularly includes first and second perpendicular outer surfaces, the first surface being coplanar with the outer surface of the swing plate when the latter is positioned adjacent the casing in its recessed position, the second surface of the heel plate being coplanar and preferably coextensive with the other of the pair of mutually perpendicular pair of measuring surfaces of the main body casing. Further, the heel plate is preferably comprised of a magnetic material. An extension piece is also preferably provided and is adapted to be connected adjacent the first surface of the heel plate to assist when the swing plate is in its extended position. The extension piece more particularly includes an outer surface which is coplanar with the outer surface of the swing plate when the latter is positioned laterally offset from the casing in its extended position. The extension piece is also preferably comprised of a magnetic material.

In accordance with still further aspects of the present invention, the angle indicating means preferably comprises a dial plate which is fixed within the casing and has indicia marked thereon which are arranged in a circular 360 degree notation. Pendulum means are also provided and are freely pivotable with respect to the dial plate for indicating a particular angle. The pendulum means more particularly comprises a magnifying lens which includes a planar inner surface adjacent the indicia on the dial plate and a convex outer surface through which the indicia may be read. The magnifying lens also preferably includes marker means for reducing parallax error when the indicia are being read, the preferred marker means taking the form of a thin, vertical scribe line or hairline positioned on the convex surface of the lens. The inner planar surface of the magnifying lens may have a second vertical scribe line positioned thereon for further reducing parallax error, the second line preferably being somewhat thinner than the first outer hairline.

In accordance with more specific aspects of the present invention, the magnifying lens includes means for pivotally mounting same to the center of the dial plate, the mounting means including a pivot pin pointed at both ends and connected transversely to the magnifying lens, the dial plate having conical recess means for receiving one of the pointed ends of the pivot pin. The casing of the level preferably includes a transparent outer face positioned over the angle indicating means and having conical recessed means for receiving the other of the pointed ends of the pivot pin.

In accordance with yet other aspects of the present invention, the dial plate may further include a second set of indicia marked on the reverse side thereof in substantially the same manner as the first side. A second pendulum means may also be provided so as to be freely pivotable with respect to the reverse side of the dial plate, the second pendulum means being constructed substantially identically to the above-described first pendulum means. In an alternative construction, the magnifying lenses may both be connected to a common pivot pin which extends through an aperture centrally positioned in the dial plate. The pivot pin has pointed ends which reside in a pair of conical recess means positioned on the inner surfaces of the outer transparent plates of the casing. Each of the magnifying lenses are mounted to the pivot pin via transversely positioned shafts such that the lenses are free to rotate about the pin and the pin is free to rotate in its bearings.

In accordance with yet other aspects of the present invention, means may be positioned within the casing for illuminating the dial plate in a direct fashion. The illuminating means may comprise at least one light source placed in an edge-on adjacent relationship to the dial plate, and means may also be provided intermediate the light source and the dial plate for directing a majority of the light issuing from the source to the edge of the plate where it will be dispersed for increasing the readability of the dial. The illuminating means may further comprise a second light source placed in a similar fashion to the first source but angularly displaced with respect thereto, and a focusing lens may also be provided for the second light source to capture and direct its output to the dial face for more efficient illumination. The light sources may be battery powered and controlled by an external on-off switch which may be recessed to provide yet a third measuring surface for the instrument.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 6 is an enlarged cross-sectional view illustrating the details of construction of the preferred embodiment illustrated in FIG. 2 and taken along line 6—6 thereof;

FIG. 7 is an end view of the same instrument as illustrated in FIG. 4 but shown in a different operational mode;

FIG. 8 is a front view, partially broken away, of the instrument as illustrated in FIG. 7 in its alternate operating mode;

FIG. 9 is a cross-sectional view of an alternative embodiment of indicator means which may be utilized in the device of the present invention;

FIG. 10 is a plan view, partially broken away, which illustrates a different and alternative embodiment of the present invention;

FIG. 11 is an end view of the alternative embodiment illustrated in FIG. 10;

FIG. 12 is an enlarged cross-sectional view which illustrates internal construction details forming a part of the alternative embodiment illustrated in FIG. 10 and taken along line 12—12 thereof;

FIG. 13 is a plan view of an optional accessory which may be utilized in the embodiments illustrated in FIGS. 1 through 8;

FIG. 14 is a side view of the component illustrated in FIG. 13;

FIG. 15 is a plan view which illustrates an alternative optional accessory that may be utilized with the alternative embodiment illustrated in FIGS. 10 through 12 of the present invention; and FIG. 16 is a side view of the component illustrated in FIG. 15.

DETAILED DESCRIPTION OF THE PREFERRED EMBODIMENTS

Figure 1:
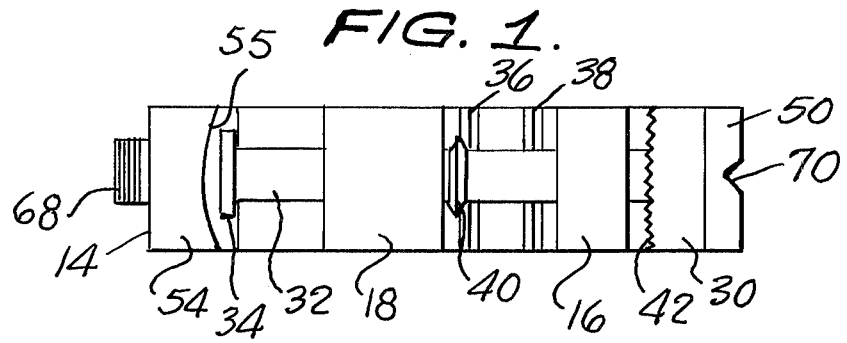
FIG. 1 is a top plan view illustrating a preferred embodiment of the present invention.

Referring now to the drawings, wherein like reference numerals represent identical or corresponding parts throughout the several views, and more particularly to FIGS. 1 through 5, there is illustrated a preferred embodiment of the present invention which is indicated generally by reference numeral 10 and is shown in top, side, bottom, and plan views.

Figures 2, 3, 4:
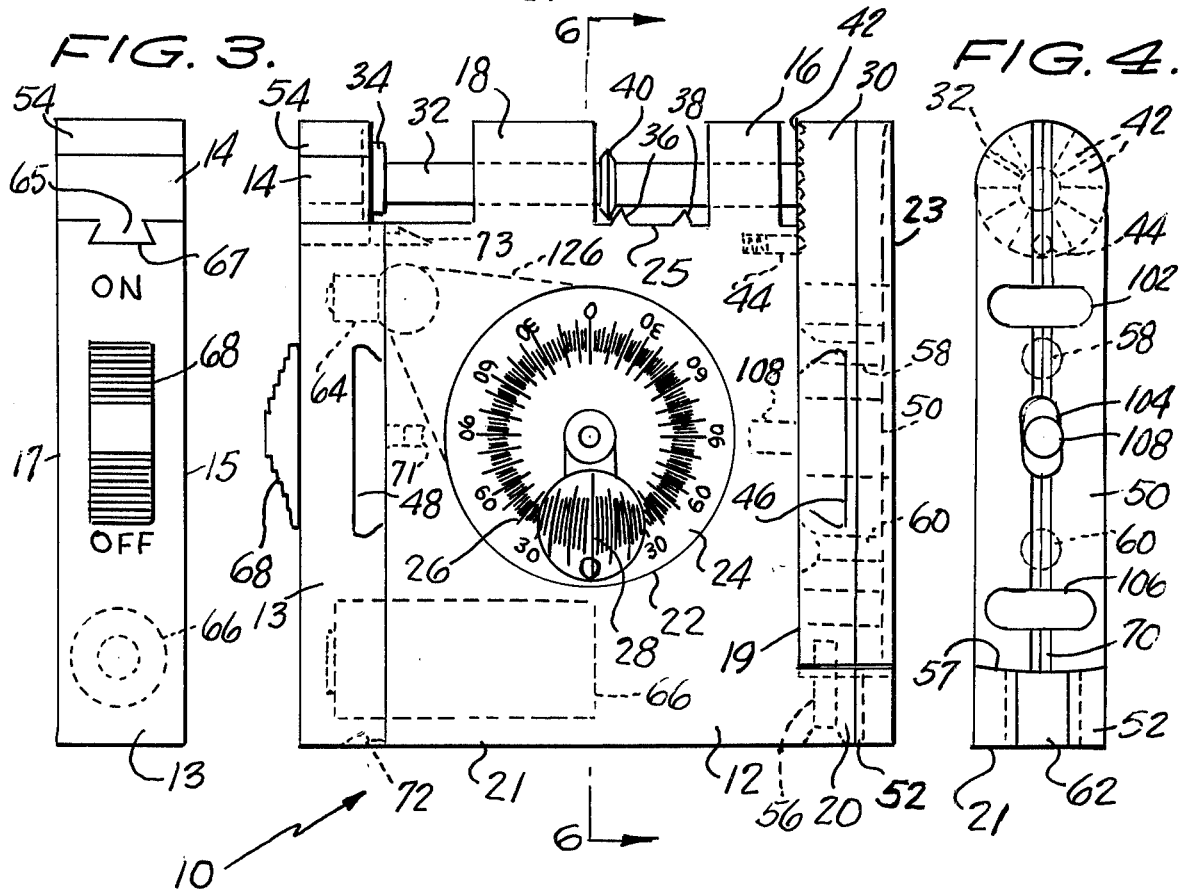
FIG. 2 is a front plan view illustrating the preferred embodiment shown in FIG. 1.
FIG. 3 is an end view of the preferred embodiment of the present invention shown in FIG. 2.
FIG. 4 is another end view of the preferred embodiment of the present invention illustrated in FIG. 2.
Figure 5:
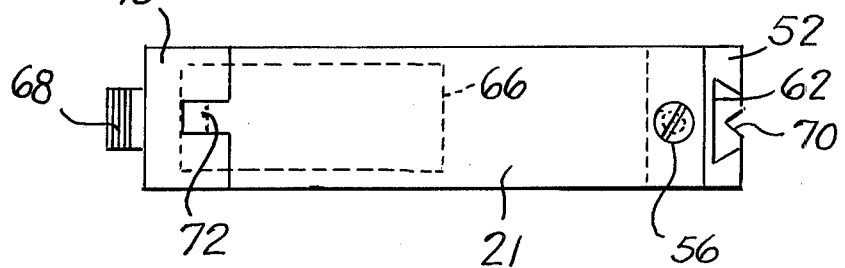
FIG. 5 is a bottom view of the instrument illustrated in FIG. 2.

The level indicator device 10 includes a main frame or casing 12 which is, as seen in FIG. 2, somewhat square in shape and includes a front planar surface 15, and a planar rear surface 17 which is substantially parallel to the front surface 15. The bottom edge of the level 10 consists of a substantially planar bottom surface 21, and forms a main measurement surface for the instrument. A second measurement surface is indicated by reference numeral 23 and is formed by the right most edge of the instrument which is planar and substantially perpendicular to the bottom edge 21.

Extending upwardly and preferably integrally formed from the main frame or casing 12 are a pair of post members 16 and 18, each of which has transversely extending apertures formed therein for receiving the pivot arm 32 of a swing plate assembly to be described in more detail hereinafter.

The left hand side of the main frame or casing 12, as viewed in FIG. 2, includes a removable cover 13, for a purpose to be described in more detail hereinafter, which may be held to the main frame 12 by means of tab members shown in dotted outline and indicated by reference numerals 71, 72 and 73.

Interfittingly engaged with the removable cover 13 by means of a tongue 65 and groove 67 assembly (FIG. 3) is an end post 14 whose upper surface 54 is preferably comprised of a magnetic substance. The bottom surface 21 of casing 12 terminates at one end in a bottom post or heel plate 20, the lower surface of which is preferably coextensive with the bottom planar surface 21. Heel plate 20, as viewed in FIG. 4, includes a lateral outer surface, coplanar with the right edge 23 of the level 10, and preferably formed of a magnetic material. The magnetic sole 52 has formed therein a dovetail groove 62 (FIGS. 4 and 5) which is sized so as to interfittingly receive the tongue 65 of lift member 14, for a purpose to be described in more detail hereinafter.

Centrally disposed on the front surface 15 of casing 12 is a substantially circular transparent cover portion 22 which may be comprised of transparent plastic, glass, or the like. The circular cover 22 exposes a substantially round dial indicator 24 which is also translucent and may be comprised of glass to permit sidewise illumination thereof, in a manner to be described in more detail hereinafter. Dial indicator 24 preferably has scale markings and numerals formed thereon in the manner indicated in FIG. 2 so as to cover a full 360 degree measuring range. The dial indicator 24 and associated scale markings and numerals are preferably quite small, but present finely marked and divided indicia to permit accurate readings therefrom. To permit the indicia to be accurately read, the angle indicator or marker is provided in a pendulum-style in the form of a magnifying lens 26, which is illustrated in FIG. 6.

The lens 26 includes a convex outer surface and a substantially planar inner surface adjacent the dial indicator 24. In this fashion, the indicia readings or scale markings on the dial indicator 24 will be magnified to a viewer or operator in such a fashion so as to permit easy reading thereof. Further, a scribe mark or hairline 28 is vertically disposed along the outer convex surface of the pendulum lens 26. If the operator uses caution and ensures that the scribe mark 28 is always vertical when readings are taken from dial indicator 24, parallax error will be virtually eliminated. That is, the hairline 28 will only appear straight when viewed head on.

The right measuring surface 23 of the level indicator 10 forms the right surface of a swing plate assembly indicated generally by reference numeral 30. The swing plate 30 is adjustable to one of two general operational positions, recessed and extended. The recessed position is as illustrated in FIGS. 1 through 5, while the extended position is as illustrated in FIGS. 7 and 8, to be described in more detail hereinbelow.

The swing plate 30 consists of an elongated member whose right edge 23 is coextensive with the right measuring edge of the level indicator 10 and is also coplanar, when in the recessed position illustrated in FIGS. 1 through 5, with the magnetic sole 52 of the heel plate 20. The swing plate 30 is pivotable about an axis defined by a transversely extending pivot arm 32 which is positioned, as explained hereinabove, through apertures formed in upstanding post members 16 and 18. The left most limit of travel of swing plate 30 is defined by a pivot arm stop 34 which forms the left end of pivot arm 32 as illustrated in FIG. 2.

The lateral position of swing plate 30 is controlled by means which include limit stops 36 and 38 and a flange 40 formed about pivot arm 32. Limit stops 36 and 38 extend upwardly from the top surface 25 of casing 12 and are each in relative juxtaposition to post members 18 and 16, respectively. They are positioned in such a fashion so as to enable the circular flange 40 to be selectively positioned either to the left of stop 36, or to the right of stop 38 (FIG. 8), said positions defining the recessed and extended positions of swing plate 30.

In either the recessed or extended positions, swing plate 30 may be pivotally rotated about its pivot arm 32. To this end, the lower surface of plate 30 is curved as indicated by reference numeral 57 in FIG. 4, and is congruent with the upper surface of heel plate 20. Further, means are provided on the inner surface of swing plate 30 to permit same to be pivotally stepped to a plurality of different angular positions with respect to casing 12. These means include a plurality of recessed radially extending notches 42 which are preferably formed at 15 degree intervals thereabout. Cooperating with notches 42 is a spring-loaded detent 44 housed mainly within casing 12. Detent 44 is biased by its spring so as to be normally engaged by a pair of adjacent notches 42 to maintain swing plate 30 in a desired orientation with respect to casing 12.

The swing plate 30 preferably includes an outer magnetic surface 50 to permit easy adherence of the swing plate 30 to a metallic surface being aligned. In use, in the recessed position illustrated in FIGS. 2 and 4, the swing plate 30 may be advanced through its arch of movement in 15° increments to any spread permissible by the work piece being measured. In an extended position, the metallic edge 50 of swing plate 30 will cooperate with the metallic sole 52 of heel plate 20 so as to define a planar reference surface to provide greater accuracy and stability during measurement. The heel plate 20, in other words, acts to support the level 10 away from the surface being read by the same amount as the distance being maintained by the swing plate 30 in such position. The magnetic sole 50 of the swing plate 30 may be aligned to offset surfaces and may serve as a base to permit alignment of hard to get to surfaces. The accuracy is maintained by the dual pivot arm bearing within posts 16 and 18, in combination with the third reference point provided by heel plate 20.

The swing plate 30 may also include a plurality of screw-receiving apertures 58 and 60 which permit the swing plate 30 to be more permanently secured to a mounting surface, as desired. The swing plate 30 may be further provided with a plurality of elongated slots 102, 104 and 106 to further permit easy mounting of the swing plate to an external surface. The elongation of slots 102, 104 and 106 obviate the necessity for utilizing precisely positioned mounting holes, and eliminate the necessity for making precise adjustments to the indicator before tightening whatever fasteners are utilized. A threaded hole 108 may also be provided in the right side 19 of main casing 12 to permit the casing 12 to be directly attached to a threaded screw, rod, or bolt if the need arises.

The swing plate 30 is further preferably provided with a small, V-shaped groove 70 positioned longitudinally along the outer magnetic surface 50. The V-groove 70 permits the level 10 to be utilized in connection with edges and with small-diameter cylindrical objects, in addition to the normal flat surfaces. V-groove 70 in swing plate 30 will also act to establish a means for narrowing the range of skew that might effect the magnetic adhesion of the plate 50 to the surface to be aligned. Note that the heel plate 20 may also be provided with a screw-receiving aperture 56 to enable the swing plate 30 to be secured to the main casing 12 in the position illustrated in FIGS. 2 and 4, if desired. The swing plate 30 may further be provided with a handgrip in the form of an indentation 46, which may be utilized in conjunction with the hand-grip or indentation 48 formed in the cover piece 13, for extending the swing plate 30 to its laterally offset or extended position as illustrated in FIG. 8.

Referring now to FIGS. 7 and 8, the swing plate 30 is illustrated in both a rotated position relative to FIGS. 2 and 4, and in its extended or laterally offset position relative to FIGS. 2 and 4 also. As can be appreciated from FIG. 8, in the extended position, the notches 42 become disengaged from the detent 44 and permits the main casing 12 to act in a free swinging manner from pivot arm 32 so as to always be vertically disposed. That is, the main casing 12 of the level 10 will, in this mode, automatically seek the most vertical or nearly vertical position possible. In the extended mode, the lift plate 14 may be detached from casing 13 and mounted within slot 62 of heel plate 20 to act as an extension piece to serve the same function as did heel plate 20 in the recessed mode. In the free swinging mode, however, the need for the extended heel plate is not as great as in the recessed mode described hereinabove, since the magnetic force provided by magnetic sole 50 of swing plate 30 will be sufficient in most cases to securely adhere the device to the surface being measured. Note, however, that lift 14 is provided with a curved inner surface 55 (FIG. 1) in order to be congruent with the surface 57 of swing plate 30 to permit free rotation thereof if utilized.

FIG. 8 also indicates in a cut away portion means for illuminating the dial indicator 24 to further facilitate the readability of the level device 10. The illuminating means preferably includes a light source 64 in the form of a small conventionally available bulb that is powered by a flashlight battery 66. Battery 66 may be positioned within a cylindrical recess 74 (FIG. 6) formed in casing 12. At the right hand side of recess 74 is located the terminal 76 of an electrical lead 78 for establishing a circuit path between the negative terminal of battery 66 and the casing of lamp 64. Another electrical lead 80 extends between the positive terminal of battery 66 and a further electrical lead 82 which is attached to and moved with the inner portion of an externally mounted on/off switch 68. It may be appreciated that when switch 68 is moved upwardly to its "on" position, the upper portion of lead 82 will contact the terminal 84 of lamp 64 to complete the circuit and energize the lamp. Note that the dial indicator 24 is edge wise illuminated to provide full direct illumination thereof.

A shaped lens 126 may also be provided to act as a means for concentrating the light emitted by bulb 64 onto the edge of dial 24. Referring to FIGS. 13 and 14, a preferred embodiment of the shaped lens 126 is illustrated and is seen to include a concave surface 128 for closely cupping the bulb 64 to direct the output light towards the edge of dial 24 to illuminate same.

Referring now to FIG. 6, the cross-sectional view illustrates the bearing structure for the lens indicator assembly, and it may be appreciated that, in a preferred embodiment, the level 10 includes an indicator on both sides 15 and 17 of casing 12. Inasmuch as the constructions of the two assemblies are substantially identical, equivalent or corresponding parts of the second assembly have been indicated by reference numerals with a prime.

Each of the pendulum lens magnifiers 26 and 26' are pivotally mounted between outer covers 22 and 22' and the inner dial portions 24 and 24' of the level 10. To this end, the dial indicator 24 is provided with a central stub 86 having a pair of conical recesses 88 and 88' formed on both surfaces thereof. Positioned diametrically opposite stub 86 on the inner surfaces of transparent covers 22 and 22' are a pair of inwardly extending axle-receiving stubs 90 and 90' also having conical recesses 92 and 92' formed therein.

Each of the pendulum lenses 26 and 26' include a swing arm 94 and 94' having an integrally formed pivot axis 96 and 96' having pointed ends 98 and 98', respectively, for permitting the lenses 26 and 26' to enjoy a virtually frictionless pendulum-like pivot.

Referring now to FIG. 12, an alternative bearing arrangement for the pendulum lenses 26 and 26' is illustrated. In the FIG. 12 embodiment, an aperture 136 is provided in the center of dial 24. A metal pin 140, pointed at both ends, extends through aperture 136 in a non-contacting manner and has a central positioner or washer 138 thereon. Each swing arm 94 and 94' includes an aperture 142 and 142', respectively, for pivotally receiving the pin 140 therethrough, The pendulum indicators 26 and 26' are then free to pivot about shaft 140, and the shaft 140 is, in turn, free to pivot in place. Accordingly, the surface with the lesser degree of friction would permit the required movement.

Referring back to FIG. 9, there is illustrated another embodiment of an indicator/magnifier lens 100, shown in cross-section, which includes an outer scribe mark 110 formed on the convex surface, and an inner scribe mark 112 formed on the planar surface. The two scribe marks 110 and 112 are vertically aligned with one another, and mark 110 is somewhat wider than mark 112 to compensate for the magnifying effect of lens 100. The double scribe marks provide further means for preventing parallax error, inasmuch as both marks 110 and 112 must be visually aligned to represent a single straight line prior to a valid reading of the instrument.

Referring now to FIGS. 10 and 11, an alternative embodiment of the present invention is illustrated which features the utilization of a pair of light sources 118 and 120 in the form of conventional bulbs. The casings of the bulbs 118 and 120 are interconnected via an electrical lead 119, and the casings are connected to the negative terminal of battery 66 via electrical lead and contact 117. The positive terminals of the lamps are connected to the positive terminal of battery 66 via electrical leads 127 that is slidingly coupled to a lead 129 formed on the rear surface of a recessed on/off switch 114. Switch 114 is multipositioned with respect to terminals 124 and 122 of lamps 118 and 120, respectively, such that one or both may be turned on, as desired. Note also that the lamps 118 and 120, as well as the battery 66, may be easily replaced by removing the snap in closure or cover member 113. The recessing of on/off switch 114 permits the side 116 of the casing 113 to be utilized as a third alignment surface, if desired.

The embodiment of FIGS. 10 and 11 may also be utilized in conjunction with a double bulb shaped lens 130 (FIGS. 15 and 16) for directing the output of bulbs 118 and 120 to the edge of dial indicator 24. The double bulb shaped lens 130 includes in this case a pair of concave surfaces 132 and 134 for receiving the surfaces of bulbs 118 and 120, and are shaped to permit easy removal of the bulbs when replacement is required.

It may be appreciated from the foregoing that I have provided a novel, unique, reliable and easy to use alignment tool which combines several features which make it a superior alignment instrument. The present invention, for example, by virtue of the magnetic surfaces, clamps directly to the work piece whose alignment is to be checked, offers large readable characters by means of magnified pendulum lenses, despite a compact size, offers in-built parallax correction and an outer hairline for improved resolution, provides built in illumination to further facilitate dial readings, offers two viewing faces for additional viewing angles, can be offset from its swing plate in 15° increments or allowed to free swing as the particular use may dictate, and employs a fixed-position heel plate and magnetic sole, plus an extension lift, for greater three-point stability. The positive stops for the swing plate maintain the same in the desired position until a positive effort is exerted to change same. In addition to aligning metal tools and work pieces, the present invention may be attached to angleirons and other steel forms when setting up structures to ensure proper alignment, may be adhered to metal frames of mobile homes when blocking an leveling same, may be attached to curtain rods, metal shelves, and the like during installation, and may be temporarily attached to metal forms or straight pieces to add length to the level base for typical builder's applications.

Obviously, numerous modifications and variations of the present invention are possible in light of the above teachings. It is therefore to be understood that within the scope of the appended claims, the invention may be practiced otherwise than as specifically described herein.

I claim as my invention:

1. A level, which comprises:
a main body casing having a pair of mutually perpendicular planar measuring surfaces disposed as the outer edges thereof;
means centrally disposed in said casing for indicating the angle of inclination of said measuring surfaces with respect to the vertical which comprises an angle indicia bearing dial plate fixed within said casing and pendulum means freely pivotable with respect to said dial plate about a measurement axis and having a magnifying lens with a planar inner surface adjacent said dial plate and a convex outer surface through which said angle indicia on said dial plate may be read, a thin vertical scribe line being positioned on said convex outer surface and a second vertical scribe line thinner than said thin vertical scribe line positioned on said planar inner surface for reducing parallax error when said indicia are being read; and
means for selectively positioning one of said surfaces either adjacent said casing or laterally offset therefrom.

2. The level as set forth in claim 1, wherein said selective positioning means comprises a swing plate having an outer surface that comprises said one surface, and means for pivoting said one surface with respect to said casing which comprises a pivot arm that extends transversely from one end of said swing plate and is perpendicular to said measurement axis.

3. The level as set forth in claim 2, wherein said outer surface of said swing plate is comprised of a magnetic material.

4. The level as set forth in claim 2, wherein said swing plate further comprises aperture means positioned therethrough for receiving mounting means for mounting said swing plate to a surface to be measured.

5. The level as set forth in claim 2, wherein said swing plate further comprises a V-shaped notch extending longitudinally thereof for permitting alignment of edges and curved surfaces.

6. The level as set forth in claim 2, wherein said one end of said swing plate includes means formed on the inner surface thereof for permitting incremented pivotal rotation of said swing plate with respect to said casing.

7. The level as set forth in claim 6, wherein said incremented rotation permitting means comprises a plurality of notches that radially extend outwardly from the point of attachment of said pivot arm to said one end of said swing plate.

8. The level as set forth in claim 7, further comprising detent means extending from said casing parallel to said pivot arm so as to be engaged by said notches to define a particular angular orientation of said swing plate when in its recessed position.

9. The level as set forth in claim 1, wherein said second vertical scribe line is thinner than said thin vertical scribe line.

10. The level as set forth in claim 1, wherein said magnifying lens includes means pivotably mounting same to the center of said dial plate.

11. The level as set forth in claim 10, wherein said mounting means includes a pivot pin pointed as both ends and connected transversely to said magnifying lens, said dial plate having conical recess means for receiving one of said pointed ends of said pivot pin.

12. The level as set forth in claim 11, wherein said casing includes a transparent outer face positioned over said angle indicating means and having conical recess means for receiving the other of said pointed ends of said pivot pin.

13. The level as set forth in claim 12, wherein said dial plate comprises a second set of indicia marked on the reverse side thereof in substantially the same manner as the first side, and further comprising second pendulum means freely pivotable with respect to the reverse side of said dial plate and constructed substantially identically to the first-named pendulum means.

14. The level as set forth in claim 1, wherein said dial plate comprises a second set of indicia marked on the reverse side thereof in substantially the same manner as the first side, and further comprising second pendulum means freely pivotable with respect to the reverse side of said dial plate and constructed substantially identically to the first-named pendulum means.

15. The level as set forth in claim 14, wherein said casing includes transparent outer plates positioned on both sides of said angle indicating means.

16. The level as set forth in claim 15, wherein each of said magnifying lenses include means pivotally mounting same to said transparent outer plates.

17. The level as set forth in claim 16, wherein said pivotal mounting means includes a pivot pin having pointed ends and extending freely through an aperture centrally positioned in said dial plate.

18. The level as set forth in claim 17, wherein each of said outer plates includes conical recess means positioned on the inner surfaces thereof for respectively receiving said pair of pointed ends of said pivot pin.

19. The level as set forth in claim 18, wherein each of said magnifying lenses include transversely positioned shafts through which said pivot pin freely extends.

20. The level as set forth in claim 1, further comprising means positioned within said casing for illuminating said dial plate.

21. The level as set forth in claim 20, wherein said illuminating means comprises at least one light source placed in an edge-on relationship to said dial plate.

22. The level as set forth in claim 21, further comprising means positioned intermediate said light source and said dial plate for directing most of the light issuing from said source to the edge of said plate.

23. The level as set forth in claim 21, wherein said illuminating means comprises a second light source also placed in an edge-on relationship to said plate but angularly displaced from said one light source.

24. The level as set forth in claim 23, further comprising means positioned intermediate said one and second light sources and said dial plate for directing most of the light issuing from said sources to the edge of said plate.

25. A level, which comprises:
a main body casing having a pair of mutually perpendicular planar measuring surfaces;
means centrally disposed in said casing for indicating the angle of inclination of said measuring surfaces with respect to the vertical, which comprises an angle indicia bearing dial plate fixed within said casing and pendulum means freely pivotable with respect to said dial plate about a measurement axis; and
means for selectively positioning one of said surfaces either adjacent said casing or laterally offset therefrom which comprises a swing plate having an outer surface that comprises said one surface, and means for pivoting said one surface with respect to said casing that comprises a pivot arm that extends transversely from one end of said swing plate and is perpendicular to said measurement axis.

26. A level which comprises:
a main body casing having a pair of mutually perpendicular planar measuring surfaces disposed as the outer edges thereof;
means centrally disposed in said casing for indicating the angle of inclination of said measuring surfaces with respect to the vertical;
means for selectively positioning one of said surfaces either adjacent said casing or laterally offset thereform including means for pivoting said one surface with respect to said casing, which comprises a swing plate having an outer surface that comprises said one surface;
wherein said pivoting means comprises a pivot arm that extends transversely from one end of said swing plate and said main body casing further includes means for moveably receiving said pivot arm to permit lateral and rotational movement thereof.

27. The level as set forth in claim 26, wherein said selective positioning means comprises flange means extending peripherally about said pivot arm, and means cooperating with said flange means for limiting the lateral movement of said pivot arm between a recessed position and an extended position.

28. The level as set forth in claim 27, wherein said lateral movement limiting means comprises said means for moveably receiving said pivot arm.

29. The level as set forth in claim 28, wherein said means for moveably receiving said pivot arm comprises a pair of upstanding spaced posts having coaxial shafts formed therethrough.

30. The level as set forth in claim 29, wherein said lateral movement limiting means further comprises a pair of ridges formed on the upper surface of said casing in juxtaposition to said pair of upstanding post members, respectively, so as to permit said flange means to be selectively disposed between one of said ridges and its juxtaposed post member.

31. A level which comprises:
a main body casing having a pair of mutually perpendicular planar measuring surfaces disposed as the outer edges thereof;
means centrally disposed in said casing for indicating the angle of inclination of said measuring surfaces with respect to the vertical;

means for selectively positioning one of said surfaces either adjacent said casing or laterally offset therefrom including means for pivoting said one surface with respect to said casing, which comprises a swing plate having an outer surface that comprises said one surface;

wherein said pivoting means comprises a pivot arm that extends transversely from one end of said swing plate and said main body casing further comprises a heel plate having first and second perpendicular outer surfaces, said first surface being coplanar with said outer surface of said swing plate when the latter is positioned adjacent said casing, said second surface being coplanar with the other of said pair of mutually perpendicular pair of measuring surfaces.

32. The level as set forth in claim 31, wherein said heel plate is comprised of a magnetic material.

33. The level as set forth in claim 31, further comprising an extension piece adapted to be connected adjacent said first surface of said heel plate, said extension piece having an outer surface coplanar with said outer surface of said swing plate when the latter is positioned laterally offset from said casing.

34. The level as set forth in claim 33, wherein said extension piece is comprised of a magnetic material.

* * * * *